No. 854,559. PATENTED MAY 21, 1907.
E. S. BOYD.
DITCHING MACHINE.
APPLICATION FILED AUG. 8, 1906.

Witnesses
Frank B. Hoffman
C. C. Hines

Inventor
E. S. Boyd
By Victor J. Evans
Attorney

UNITED STATES PATENT OFFICE.

EDWIN S. BOYD, OF NORRIS CITY, ILLINOIS.

DITCHING-MACHINE.

No. 854,559.　　　　　Specification of Letters Patent.　　　　Patented May 21, 1907.

Application filed August 8, 1906. Serial No. 329,784.

*To all whom it may concern:*

Be it known that I, EDWIN S. BOYD, a citizen of the United States, residing at Norris City, in the county of White and State of Illinois, have invented new and useful Improvements in Ditching-Machines, of which the following is a specification.

This invention relates to improvements in excavating machines of that character designed for making ditches or trenches, the object of the invention being to provide a simple construction of machine of this character which is susceptible of being manufactured at a comparatively low cost and is efficient and reliable in action; a further object being to provide a machine having means for discharging the removed earth at one side of the formed ditch and for throwing the ditch cutting devices into and out of operation in a convenient manner at will.

With the above and other objects in view, the invention consists of the novel construction, combination and arrangement of parts hereinafter fully described and claimed, reference being had to the accompanying drawings, in which:—

Figure 1:
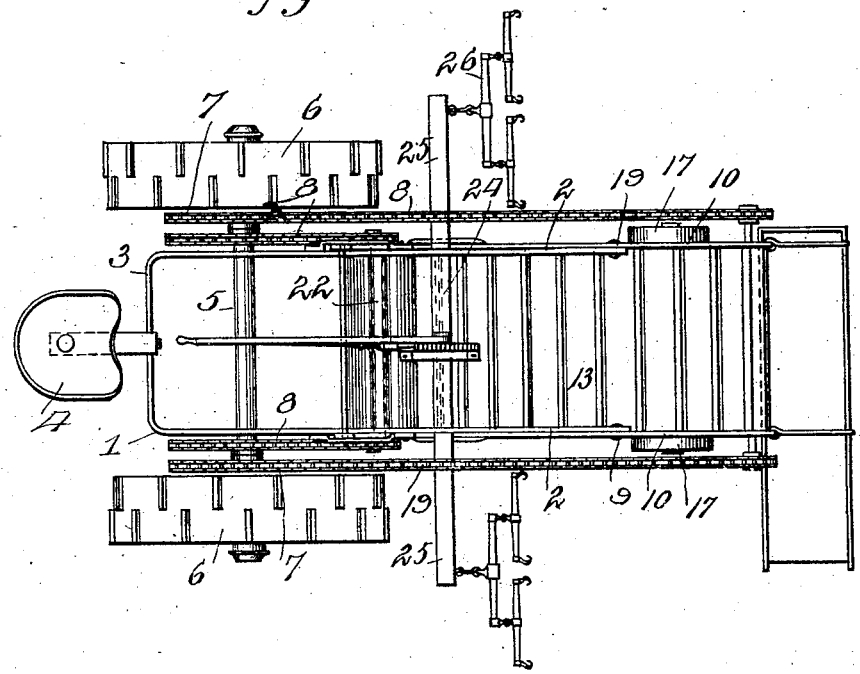
Figure 2:
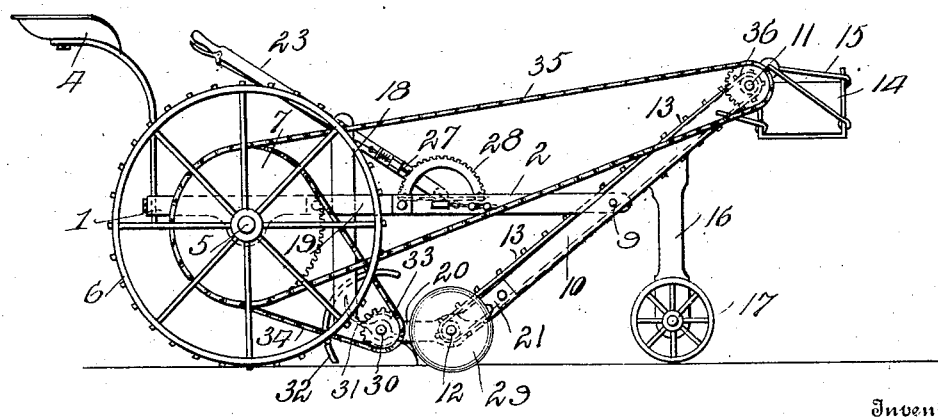

Figure 1 is a top plan view of the machine. Fig. 2 is a side elevation thereof.

Referring to the drawings, 1 designates the main frame of the machine, which, as shown, comprises a pair of parallel side bars or beams 2 connected at rear by a cross bar 3 upon which may be supported a driver's seat 4. The side bars are provided a short distance in advance of the cross bar with bearings for a transverse axle 5, carrying rear supporting or ground wheels 6, the tires of which are spurred or set to secure a firm grip on the surface of the ground. On the axle are keyed two sets of sprocket wheels 7 and 8 operating respectively to drive a conveyer and ditch cutting device, as hereinafter described.

Pivoted to the forward ends of the bars 2, as indicated at 9, are the side bars 10 of a swinging conveyer frame, in the upper and lower ends of which are journaled shafts 11 and 12 around which pass an endless conveyer belt or apron 13, said belt being arranged to discharge the earth into a chute 14 suspended from the upper portion of the conveyer frame by suitable hangers 15, said chute being properly arranged and inclined to discharge the earth removed in the formation of the ditch into a wagon or upon the ground surface at one side of the ditch.

The conveyer frame is inclined, as shown, upwardly and forwardly and carries depending standards 16 in which are journaled one or more caster wheels 17, which support the front portion of the apparatus and enable it to be conveniently steered. The lower rear end of the conveyer frame is connected with an adjusting frame comprising a pair of vertical bars 18 movable in guides 19 on the bars 2 and provided at their lower ends with forwardly extending horizontal arms 20 having oblique extensions 21 fastened to the bars of the conveyer frame, the upper ends of the bars 18 being connected by a cross rod 22. An adjusting lever 23 is pivotally mounted upon said rod and pivotally connected at its lower end to a transverse bar or beam 24 rigidly connected with the frame beams 2 and having lateral extensions 25 to which double trees or other suitable draft appliances 26 are connected, the upward and downward swinging movement of said lever on its pivotal connection with said cross beam serving to raise and lower the adjustable frame and lower rear end of the conveyer frame, as will be readily understood. The lever is provided with a pawl 27 which is adapted to be operated in any preferred manner and to engage a rack 28 on the bar 24 to secure the adjustable frame in adjusted position. The bars 18 are adapted to slide vertically in the guides 19 as well as to have sufficient movement longitudinally of the machine to compensate for the arc of swing of the lower end of the conveyer frame.

On the ends of the shaft 12 are disk cutters 29 which operate to cut into the soil and form the borders or sides of the ditch. Journaled in the arms 20 in rear of these disk cutters is a shaft 30 carrying an excavating wheel comprising a plurality of curved cutting blades 31, which curve in the direction of rotation of the wheel and operate to excavate the soil between the border lines cut by the disk 29 and to throw the earth upon the lower end of the working stretch of the conveyer apron 13, a curved shield or guard 32 being supported by the bars 18 in rear of said wheel to prevent the earth from scattering and guided in its movements toward the apron. On the shaft 30 are sprocket pinions 33 driven by chains 34 from the sprocket gears 8, whereby the excavating wheel is driven in the forward motion of the machine. Motion is conveyed to the conveyer apron through the medium of sprocket chains 35 connecting the sprocket wheels 7 with sprocket pinions 36 on the shaft 11.

In operation, the machine is drawn along the line of the proposed ditch, and the gearing transmits motion to the cutting disks and excavating wheel to remove the earth to form a ditch of the desired depth and width, the depth of cut being regulated by the vertical adjustment of the cutters through the action of the lever 23. By means of this lever the cutters may also be raised out of contact with the ground to enable the machine to be conveniently transported from place to place without the cutters coming in contact with the ground surface.

It will be seen that the construction disclosed provides an efficient and simple form of machine which may be manufactured at an extremely low cost, and in which the cutter wheel has a spading action on the ground to remove the earth in a cleanly manner and with the least possible resistance and strain on the driving gearing.

The disk cutters may be arranged to cut vertically or at any suitable angle, to make the side walls of the ditch perpendicular or sloping, as desired.

Having thus described the invention, what is claimed as new, is:—

1. In a machine of the character described, a suitable frame, disk cutters for forming the sides of the ditch, and an excavator working in rear of and on a line between said cutters.

2. In a machine of the character described, a suitable frame, disk cutters for forming the sides of the ditch, an excavator working in rear of and on a line between said cutters, and means for adjusting said cutters and excavator to regulate their depth of penetration.

3. In a machine of the character described, a suitable frame, disk cutters for forming the sides of the ditch, and a rotating excavator working in rear of and on a line between said cutters, said excavator being provided with curved blades to excavate the soil by a spading action.

4. In a ditching machine, the combination of a main frame mounted at its rear on ground wheels, an inclined conveyer pivotally mounted upon the front portion of the main frame and extending above and below the same, a supporting wheel carried by the conveyer, an adjusting frame vertically adjustable on the main frame and connected with the lower end of the conveyer, means for adjusting said adjusting frame, disk cutters arranged at the point of junction of the conveyer with the adjustable frame, a rotary excavator carried by the adjusting frame in rear of said cutters, and drive gearing for actuating the conveyer and excavator from the ground wheels.

5. In a ditching machine, the combination of a main frame mounted at its rear on ground wheels, a conveyer pivotally connected with the forward end of the main frame and extending in inclined relation above and below the same, a supporting wheel carried by the conveyer, a discharge chute arranged at the upper end of the conveyer, an adjusting frame vertically adjustable on the main frame and connected at its lower end to the lower rear end of the conveyer, disk cutters on the lower shaft of the conveyer, a rotary excavator on the adjusting frame in rear of said cutters, a lever on the main frame for adjusting said adjusting frame, and gearing for driving the conveyer and excavator from the ground wheels.

In testimony whereof, I affix my signature in presence of two witnesses.

EDWIN S. BOYD.

Witnesses:
ROBERT J. BAILEY,
CHAS. E. HENDRIX.